US012399277B2

(12) United States Patent
Govardhanam

(10) Patent No.: US 12,399,277 B2
(45) Date of Patent: Aug. 26, 2025

(54) OBJECT TRACKING USING SEMANTIC ATTRIBUTES

(71) Applicant: GM CRUISE HOLDINGS LLC, San Francisco, CA (US)

(72) Inventor: Hariprasad Govardhanam, Fremont, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 959 days.

(21) Appl. No.: 17/524,429

(22) Filed: Nov. 11, 2021

(65) Prior Publication Data

US 2023/0143761 A1    May 11, 2023

(51) Int. Cl.
| | | |
|---|---|---|
| G01S 17/66 | (2006.01) | |
| G01S 17/89 | (2020.01) | |
| G01S 17/931 | (2020.01) | |
| G06N 3/088 | (2023.01) | |

(52) U.S. Cl.
CPC ............ G01S 17/66 (2013.01); G01S 17/89 (2013.01); G01S 17/931 (2020.01); G06N 3/088 (2013.01)

(58) Field of Classification Search
CPC ...... G06V 20/56; G06V 20/64; G06V 10/255; G06V 20/647; G06V 10/454; G06V 10/62; G06V 10/764; G06V 10/806; G06V 10/82; G06V 20/70; G06V 2201/07; G06V 10/25; G06V 20/58; G06T 2207/20081; G06T 2207/20084; G06T 2207/10016; G06T 2207/10028; G06T 2207/20221; G06T 2207/30196; G06T 7/11; G06T 7/194; G06T 7/248; G06T 7/73; G06T 7/74; G06T 17/005; G06T 2207/10004; G06T 2207/20021; G06T 2207/30252; G06T 2207/30261; G06T 3/06; G06T 7/571; G06T 7/75; G06T 9/001; G06T 9/007; G06T 9/40; G06N 3/044; G06N 3/045; G06N 3/08; G06N 3/088; G01S 17/66; G01S 17/86; G01S 7/4808; G01S 17/89

See application file for complete search history.

(56) References Cited

U.S. PATENT DOCUMENTS

| | | | |
|---|---|---|---|
| 2018/0348343 A1* | 12/2018 | Achour | H01Q 1/364 |
| 2018/0348346 A1* | 12/2018 | Vallespi-Gonzalez | G01S 7/4802 |
| 2019/0371052 A1* | 12/2019 | Kehl | G01C 21/3602 |
| 2020/0207375 A1* | 7/2020 | Mehta | G05D 1/0088 |

(Continued)

OTHER PUBLICATIONS

Florin Leon et al.,"A Review of Tracking and Trajectory Prediction Methods for Autonomous Driving," Mar. 19, 2021, Mathematics 2021, 9, 660,pp. 1-28.*

(Continued)

*Primary Examiner* — Omar S Ismail
(74) *Attorney, Agent, or Firm* — CANTOR COLBURN LLP

(57) ABSTRACT

The disclosed technology provides solutions for improving object tracking. In some aspects, a process of the disclosed technology can include steps for receiving Light Detection and Ranging (LiDAR) point cloud data corresponding with an object, providing the LiDAR point cloud data to an autoencoder neural network to generate a set of feature embeddings, and tracking the object based on the feature embeddings. Systems and machine-readable media are also provided.

17 Claims, 6 Drawing Sheets

(56) References Cited

U.S. PATENT DOCUMENTS

| | | | |
|---|---|---|---|
| 2021/0063578 A1* | 3/2021 | Wekel | G01S 17/894 |
| 2021/0150230 A1* | 5/2021 | Smolyanskiy | G06V 10/82 |
| 2021/0156963 A1* | 5/2021 | Popov | G06N 3/045 |
| 2021/0271258 A1* | 9/2021 | Tran | G05D 1/0212 |
| 2021/0405638 A1* | 12/2021 | Boyraz | G06V 20/64 |
| 2022/0129685 A1* | 4/2022 | Gummadi | G06T 7/194 |
| 2022/0130145 A1* | 4/2022 | Connary | G05D 1/101 |
| 2022/0317305 A1* | 10/2022 | Chou | G05D 1/0251 |
| 2022/0382787 A1* | 12/2022 | Rhodes | G06F 16/285 |
| 2023/0029900 A1* | 2/2023 | Goel | G06V 20/647 |
| 2023/0033177 A1* | 2/2023 | Goel | G06V 20/58 |
| 2023/0057118 A1* | 2/2023 | Bankiti | G01S 17/58 |

OTHER PUBLICATIONS

Chiho Choi et al.,"Shared Cross-Modal Trajectory Prediction for Autonomous Driving," Jun. 2021, Proceedings of the IEEE/CVF Conference on Computer Vision and Pattern Recognition (CVPR), 2021, pp. 244-251.*

Feng Liu et al.,"Voxel-based 3D Detection and Reconstruction of Multiple Objects from a Single Image," Nov. 2021, 35th Conference on Neural Information Processing Systems (NeurIPS 2021),pp. 1-8.*

Mircea Paul Muresan et al.,"Stabilization and Validation of 3D Object Position Using Multimodal Sensor Fusion and Semantic Segmentation," Feb. 18, 2020,Sensors 2020, 20, 1110,pp. 1-29.*

Cumhur Erkan Tuncali et al.,"Requirements—Driven Test Generation for Autonomous Vehicles With Machine Learning Components," May 25, 2020, IEEE Transactions on Intelligent Vehicles, vol. 5, No. 2, Jun. 2020,pp. 265-277.*

Thibault Buhet et al.,"PLOP: Probabilistic poLynomial Objects trajectory Prediction for autonomous driving," Oct. 22, 2020, arXiv:2003.08744v3,pp. 1-15.*

Sayanan Sivaraman et al,"Looking at Vehicles on the Road: A Survey of Vision-Based Vehicle Detection, Tracking, and Behavior Analysis," Nov. 6, 2013, IEEE Transactions on Intelligent Transportation Systems, vol. 14, No. 4, Dec. 2013,pp. 1773-1789.*

Junwei Liang,"From Recognition to Prediction: Analysis of Human Action and Trajectory Prediction in Video," Jul. 16, 2021, arXiv:2011.10670v3,pp. 75-101 , 145-152.*

Henrik Christensenet al,"Autonomous vehicles for micro-mobility," Nov. 22, 2021, Autonomous Intelligent Systems (2021) 1:11,pp. 1-30.*

* cited by examiner

OBJECT TRACKING USING SEMANTIC ATTRIBUTES

BACKGROUND

1. Technical Field

The disclosed technology provides solutions for improving object tracking and in particular, for improving object tracking using semantic object attributes that identified/determined using a machine-learning network.

2. Introduction

Autonomous vehicles (AVs) are vehicles having computers and control systems that perform driving and navigation tasks conventionally performed by a human driver. As AV technologies advance, they will be increasingly used to improve transportation efficiency and safety. As such, AVs will need to perform many of the functions conventionally performed by human drivers, such as navigation and routing tasks necessary to provide a safe and efficient transportation. Such tasks may require the collection and processing of large quantities of data using various sensor types, including but not limited to cameras and/or Light Detection and Ranging (LiDAR) sensors disposed on the AV. In some instances, the collected data can be used by the AV to perform tasks relating to the understanding of a surrounding environment, such as by tracking the movement of various objects over time.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
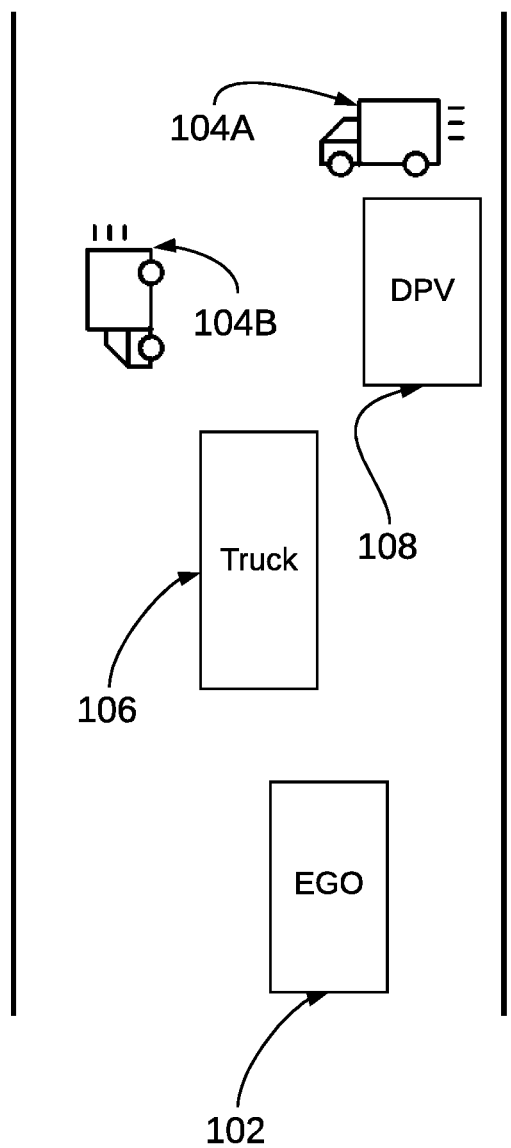
FIG. 1 conceptually illustrates an example environment in which object tracking can be performed, for example, by an autonomous vehicle (AV), according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Object tracking is an important function for any perception system that must reason about complex or dynamic environments. Conventional tracking systems, which may rely on computer-vision techniques, operate by making comparisons between attributes for encountered objects at various times. However, because conventional trackers are limited in the types of attributes they detect, and therefore consider when making such comparisons, tracking performance can be poor in scenarios where object behavior and visibility are changing or intermittent, such as when objects become occluded, or change kinematic characteristics.

Aspects of the disclosed technology address the limitations of conventional object tracking approaches by providing tracking solutions that utilize semantic characteristics/attributes to improve performance. The semantic characteristics (also: semantic attributes, or intrinsic attributes) of an object can be learned through a machine-learning (ML) training process that generates feature vectors (feature embeddings) that encode semantic representations about tracked objects. As discussed in further detail below, feature embeddings for a given object can be generated/learned through training performed using a generative ML architecture, such as using a Generative Adversarial Network (GAN) that employs an autoencoder architecture. By using feature embedding attributes, semantic properties can be used by a tracking system, such as an ML based tracker, to recognize object continuity for objects that become occluded, or change behaviors over time, such as is common for entities (e.g., vehicles, pedestrians, etc.) commonly tracked by an AV perception stack in typical driving scenarios. By utilizing the feature embeddings, tracking performance can be greatly improved for objects that exhibit behaviors or characteristics that confound conventional tracking systems.

FIG. 1 conceptually illustrates an example environment 100 in which object tracking can be performed. Environment 100 represents a driving scenario in which an ego vehicle 102, such as an autonomous vehicle (AV), can track one or more objects in the environment 100, such as other traffic (or non-traffic participants). Although the scenario illustrated in environment 100 includes only vehicles, e.g., truck 104, truck 106, and double-parked vehicle (DPV) 108, it is understood that any number (or variety) of entity types may be included. For example, environment 100 could include one or more pedestrians, bicycles, scooters, vehicles, or any other type of moving object, without departing from the scope of the disclosed technology.

In the example of FIG. 1, ego vehicle 102 can be configured to track the movement of each traffic participant, i.e., trucks 104, 106, and double-parked vehicle (DPV) 108. In the illustrated scenario, the location of truck 104 is shown at two different points in time, e.g., at a first position 104A, and later at a second position 104B. Given the locations of the other scene objects (e.g., trucks 106, 108), direct visibility of truck 104 by ego vehicle 102 may be intermittent or sporadic. For example, as the trajectory of truck 104 changes from first position 104A to second position 104B, it may become occluded by truck 106. In this arrangement, the movement of truck 104 could also cause changes to its kinematic attributes. For example, kinematic attributes (speed, velocity, acceleration, etc.) of truck 104 at the first position 104A can be different from those detected by the ego vehicle 102 at second position 104B. Due to the occlusion of truck 104, as well as the dynamic changes in certain attributes (e.g., kinematic attributes), conventional object tracking systems may have difficulty identifying object continuity as between different temporal points. That is, conventional object tracking systems may have difficulty resolving that truck 104 at first position 104A is the same object as truck 104 later detected at position 104B.

In practice, ego vehicle 102 can utilize an improved object tracking system, for example, that utilizes internal (semantic) features of the tracked object (e.g., truck 104) in order to better reason about object continuity. The semantic attributes can be encoded as feature vectors, such as feature embeddings, for example that are produced using a generative ML training approach. A further discussion of some techniques for producing feature embeddings for various object types is provided in relation to FIG. 2A, below.

Figure 2A:
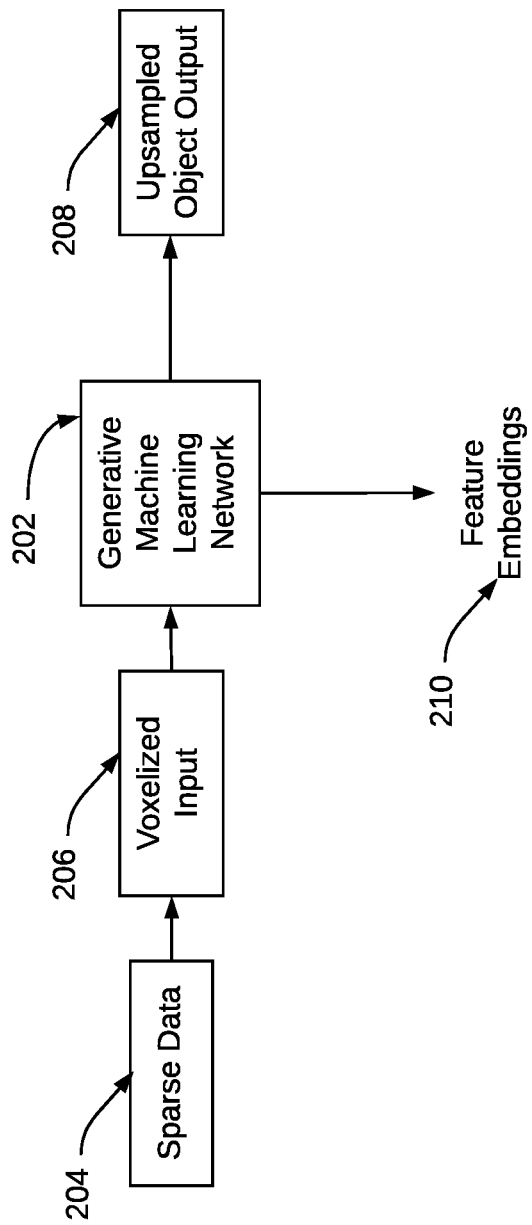
FIG. 2A illustrates an example setup of a machine-learning model that can be used to produce feature embedding attributes for different object types, according to some aspects of the disclosed technology.

FIG. 2A illustrates an example setup 200 of a machine-learning network that can be used to produce feature embedding attributes (or feature embeddings) 210 for different object types. In some implementations, training can be performed on sparse input data 204, such as Light Detection and Ranging (LiDAR) and/or camera data associated with a given object. In some approaches, pre-processing of the input data can be performed generate voxelized inputs 206, for example, in which the input data (e.g., LiDAR point cloud and/or image data) is mapped onto a three-dimensional (3D) grid. Depending on the voxelization methodology used, each cell or grid in the voxelized representation may represent some quantity of LiDAR and/or point cloud data, e.g., of the object, at a corresponding location. In some implementations, the voxelization approach may utilize statistical representations (e.g., averages, minimums, or maximums) of various sensor data at a given voxel grid location. For example, voxelization of sparse LiDAR point cloud data (204) may utilize a mapping of LiDAR points into corresponding cells in the 3D (voxel) grid, whereby the value at each cell can represent by an average return beam intensity for one or more corresponding LiDAR points at the cell location. By way of further example, the value at each cell may be represented by the median return beam intensity of the corresponding LiDAR points. It is understood that other statistical values may be used, without departing from the scope of the disclosed technology.

Once sparse input data 204 has been preprocessed to generate voxelized input 206, voxelized input 206 can be provided to generative machine-learning network 202. In some approaches, generative (adversarial) machine-learning network (GAN) 202 can utilize an autoencoder network layer, which produces semantic (vector) representations of intrinsic object characteristics, i.e., feature embeddings 210. That is, the autoencoder network can be implemented as one or more network layers that are internal to GAN 202, from which the feature embeddings 210 are extracted. In practice, the feature embeddings 210 are generated as a consequence of training performed based on the generative ML network 202, e.g., using a database of high-resolution object data. As used herein, high-resolution object data can include voxelized object representations in which each cell of the voxel is populated with a data value. By comparing outputs of the generative ML network 202, e.g., up-sampled object output 208, with high-resolution training data, the generative ML network 202 can be updated (trained) to understand various semantic (intrinsic) characteristics of a given object. As illustrated in the example of FIG. 2A, these semantic characteristics (or feature embeddings) can be represented as vectors encoded in one or more layers of the generative ML model 202, i.e., feature embeddings 210. As discussed in further detail with respect to FIG. 2B, the feature embeddings 210 for a given object—or object class—can be used by an object tracker to improve object tracking accuracy.

Figure 2B:
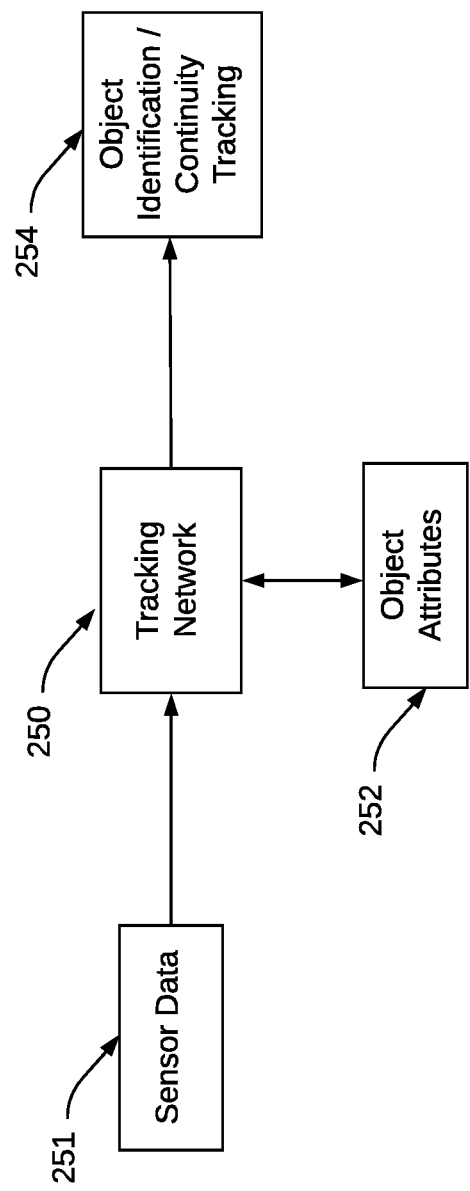
FIG. 2B conceptually illustrates an example implementation of an object tracker that is used to track one or more object using a variety of object attributes, including feature embedding attributes, according to some aspects of the disclosed technology.

FIG. 2B conceptually illustrates an example of an object tracking network 250 that is used to track one or more objects, for example, by determining a variety of object attributes 252, including feature embedding attributes (210), based on input sensor data 251. Similar to the above discussion of FIG. 2A, sensor data 251 can also be pre-processed, e.g., to generate voxelized sensor data inputs. Based on the input data, tracking network 250 can be configured to identify a variety of object attributes (e.g., for one or more objects corresponding with the sensor data), and utilize those attributes to perform tracking over time. Depending on the desired implementation, the tracking network 250 may be configured to receive a variety of input dimensions, for example, that correspond with different object attribute types. Depending on the desired implementation, object attributes 252 can include data indicating one or more of: a three-dimensional (3D) bounding box size or object size, a bounding box location (or object location), object pose, object color, object type (e.g., an object classification label), kinematic attributes, and/or object 3D voxelized geometry, etc.

In practice, tracking can be performed by comparing object attributes 252 that are identified based on received sensor data 251 at different points in time, i.e., to determine if there is continuity between the object as witnessed at different times. Further to the example discussed above with respect to FIG. 1, tracking network 250 can receive sensor data 251 acquired about truck 104, at first position 104A. Based on the sensor data corresponding with first position 104A, a variety of attributes, including one or more feature embedding attributes, can be determined for truck 104. Subsequently, tracking network 250 can receive sensor data 251 that is acquired about truck 104, at second position 104B. By comparing attributes, and notably feature embedding attributes, for sensor data associated with first position 104A, and second position 104B, tracking network can decide about object continuity (perform) tracking, that is provided by output 254.

Figure 3:
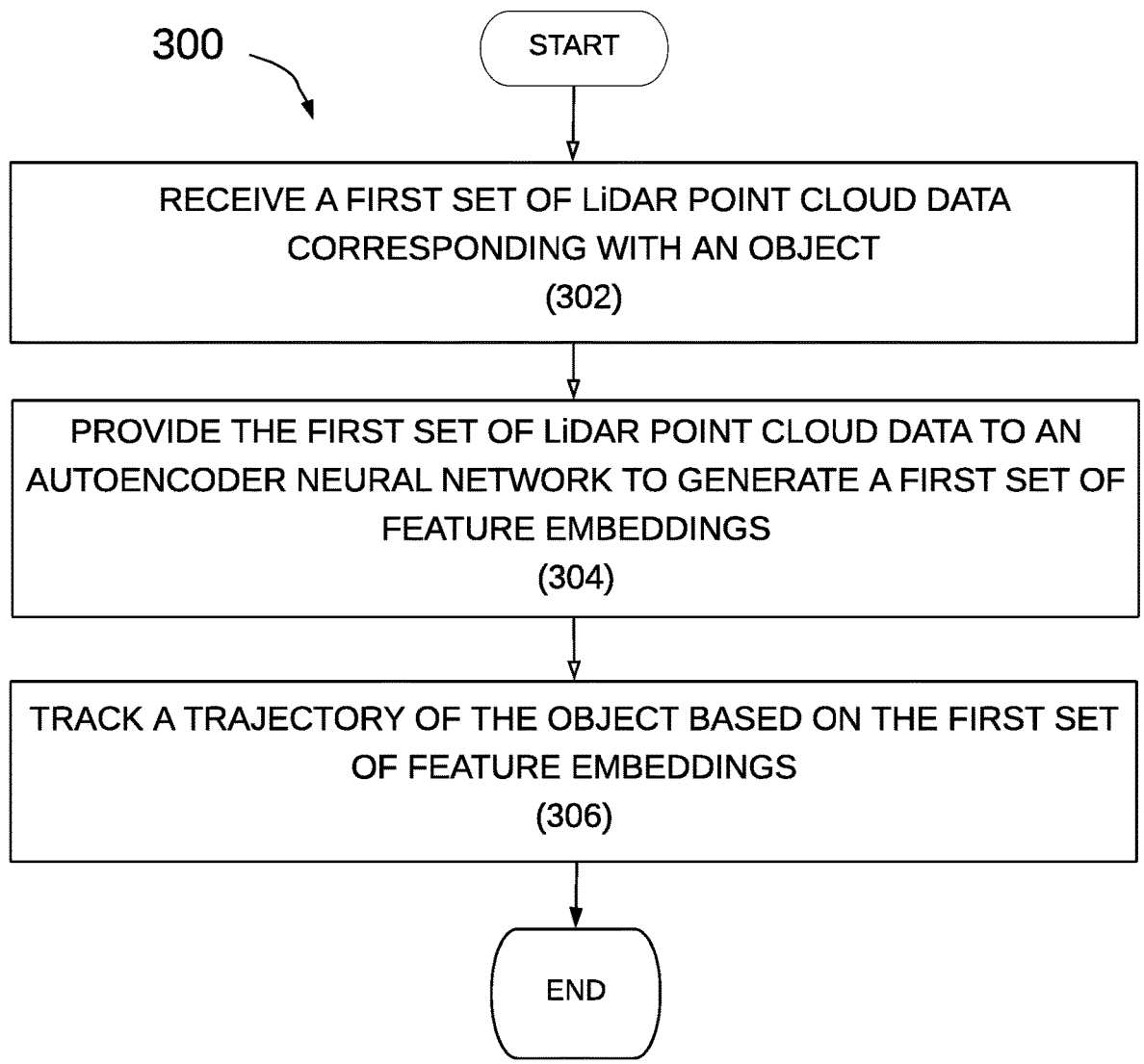
FIG. 3 illustrates a block diagram of an example process for performing object tracking based on object feature embeddings, according to some aspects of the disclosed technology.

FIG. 3 illustrates a block diagram of an example process 300 for performing object tracking based on object feature embeddings, according to some aspects of the disclosed technology. Process 300 begins with step 302 in which a first set of LiDAR point cloud data, corresponding with an object to be tracked, is received, e.g., by an object tracking ML network of the disclosed technology. In some aspects, the received sensor data can include data of other sensor modality types; for example, the received sensor data may include camera data, radar data, accelerometer data, or the like. At step 304, the process 300 includes providing the first set of LiDAR point cloud data to an autoencoder neural network, e.g., to generate a first set of feature embeddings. As discussed above, the feature embeddings can include one or more vector representations of one or more intrinsic (or internal) semantic characteristics of the corresponding object. Additionally, as discussed above, the neural network can include a generative network architecture, for example, that has been trained on objects or object classes that are similar (or identical) to those of the object for the LiDAR point cloud data.

At step 306, the process 300 includes tracking a trajectory of the object based on the first set of feature embeddings. Tracking can performed across two or more points in time, for example, that can include sensor data that is collected (e.g., by a tracking AV) at a (later) point in time subsequent to when the first set of (LiDAR point cloud) sensor data was acquired (e.g., at step 302). That is, tracking can be performed across two or more points in time, based on feature embedding attributes that are detected at those respective intervals.

Figure 4:
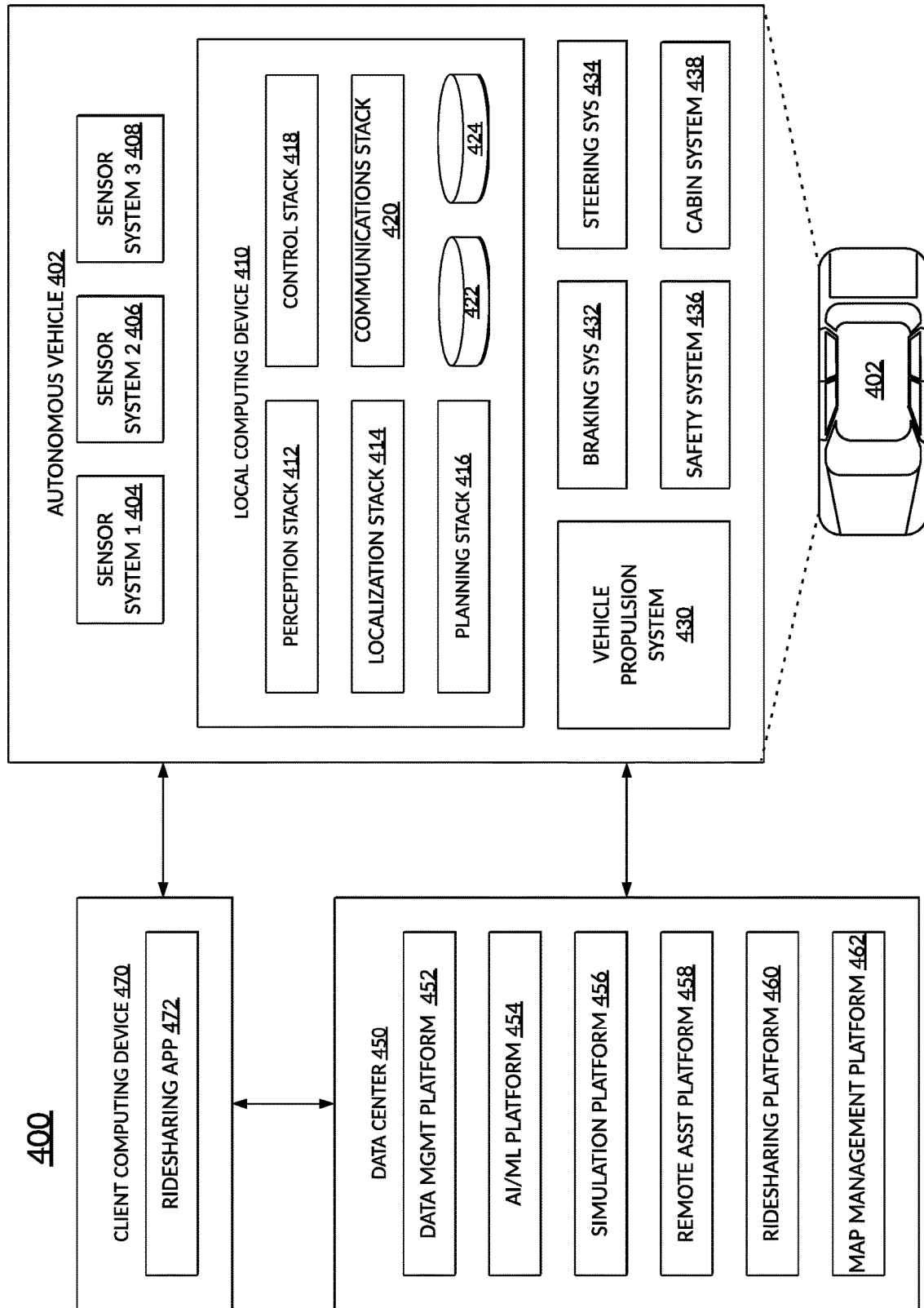
FIG. 4 illustrates an example system environment that can be used to facilitate AV dispatch and operations, according to some aspects of the disclosed technology.

Turning now to FIG. 4 illustrates an example of an AV management system 500. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 402 can navigate about roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors.

AV 402 can also include several mechanical systems that can be used to maneuver or operate AV 402. For instance, the mechanical systems can include vehicle propulsion system 430, braking system 432, steering system 434, safety system 436, and cabin system 438, among other systems. Vehicle propulsion system 430 can include an electric motor, an internal combustion engine, or both. The braking system 432 can include an engine brake, brake pads, actuators, and/or any other suitable componentry configured to assist in decelerating AV 402. The steering system 434 can include suitable componentry configured to control the direction of movement of the AV 402 during navigation. Safety system 436 can include lights and signal indicators, a parking brake, airbags, and so forth. The cabin system 438 can include cabin temperature control systems, in-cabin entertainment systems, and so forth. In some embodiments, the AV 402 may not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a planning stack 416, a control stack 418, a communications stack 420, an HD geospatial database 422, and an AV operational database 424, among other stacks and systems.

Perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 422, other components of the AV, and other data sources (e.g., the data center 450, the client computing device 470, third-party data sources, etc.). The perception stack 412 can detect and classify objects and determine their current and predicted locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth.

Mapping and localization stack 414 can determine the AV's position and orientation (pose) using different methods from multiple systems (e.g., GPS, IMUs, cameras, LIDAR, RADAR, ultrasonic sensors, the HD geospatial database 422, etc.). For example, in some embodiments, the AV 402 can compare sensor data captured in real-time by the sensor systems 404-408 to data in the HD geospatial database 422 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The planning stack 416 can determine how to maneuver or operate the AV 402 safely and efficiently in its environment. For example, the planning stack 416 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another. The planning stack 416 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 416 can select from multiple backup plans to carry out. For example, while preparing to change lanes to turn right at an intersection, another vehicle may aggressively cut into the destination lane, making the lane change unsafe. The planning stack 416 could have already determined an alternative plan for such an event, and upon its occurrence, help to direct the AV 402 to go around the block instead of blocking a current lane while waiting for an opening to change lanes.

The control stack 418 can manage the operation of the vehicle propulsion system 430, the braking system 432, the steering system 434, the safety system 436, and the cabin system 438. The control stack 418 can receive sensor signals from the sensor systems 404-408 as well as communicate with other stacks or components of the local computing device 410 or a remote system (e.g., the data center 450) to effectuate operation of the AV 402. For example, the control stack 418 can implement the final path or actions from the multiple paths or actions provided by the planning stack 416. This can involve turning the routes and decisions from the planning stack 416 into commands for the actuators that control the AV's steering, throttle, brake, and drive unit.

The communication stack 420 can transmit and receive signals between the various stacks and other components of the AV 402 and between the AV 402, the data center 450, the client computing device 470, and other remote systems. The communication stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 422 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 424 can store raw AV data generated by the sensor systems 404-408 and other components of the AV 402 and/or data received by the AV 402 from remote systems (e.g., the data center 450, the client computing device 470, etc.). In some embodiments, the raw AV data can include HD LIDAR point cloud data, image data, RADAR data, GPS data, and other sensor data that the data center 450 can use for creating or updating AV geospatial data as discussed further below with respect to FIG. 2 and elsewhere in the present disclosure.

The data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and client computing device 470. These signals can include sensor data captured by the sensor systems 404-408, roadside assistance requests, software updates, ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, a ridesharing platform 460, and map management system platform 462, among other systems.

Data management platform 452 can be a "big data" system capable of receiving and transmitting data at high velocities (e.g., near real-time or real-time), processing a large variety of data, and storing large volumes of data (e.g., terabytes, petabytes, or more of data). The varieties of data can include data having different structure (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the map management system platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the map management system platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from the map management system platform 462; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smart watch, smart eyeglasses or other Head-Mounted Display (HMD), smart ear pods or other smart in-ear, on-ear, or over-ear device, etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to be picked up or dropped off from the ridesharing application 472 and dispatch the AV 402 for the trip.

Map management system platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, UAVs, satellites, third-party mapping services, and other sources of geospatially referenced data. The raw data can be processed, and map management system platform 462 can render base representations (e.g., tiles (2D), bounding volumes (3D), etc.) of the AV geospatial data to enable users to view, query, label, edit, and otherwise interact with the data. Map management system platform 462 can manage workflows and tasks for operating on the AV geospatial data. Map management system platform 462 can control access to the AV geospatial data, including granting or limiting access to the AV geospatial data based on user-based, role-based, group-based, task-based, and other attribute-based access control mechanisms. Map management system platform 462 can provide version control for the AV geospatial data, such as to track specific changes that (human or machine) map editors have made to the data and to revert changes when necessary. Map management system platform 462 can administer release management of the AV geospatial data, including distributing suitable iterations of the data to different users, computing devices, AVs, and other consumers of HD maps. Map management system platform 462 can provide analytics regarding the AV geospatial data and related data, such as to generate insights relating to the throughput and quality of mapping tasks.

In some embodiments, the map viewing services of map management system platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ridesharing platform 460 may incorporate the map viewing services into the client application 472 to enable passengers to view the AV 402 in transit en route to a pick-up or drop-off location, and so on.

Figure 5:
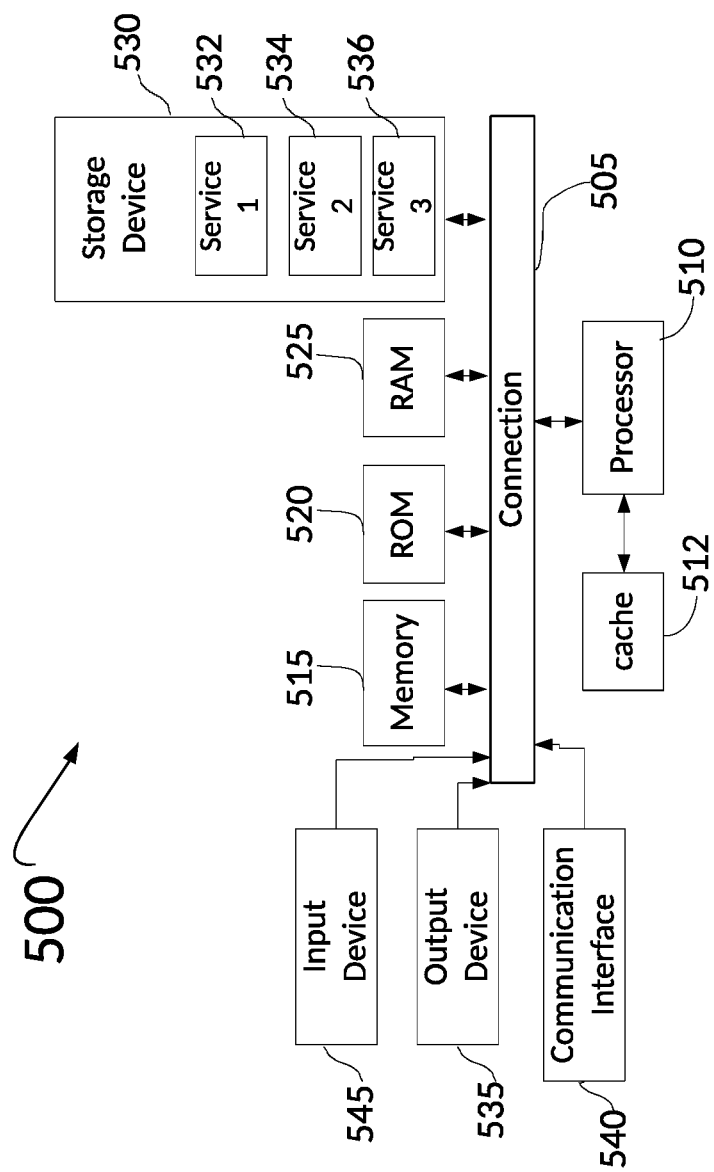
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up internal computing system 510, remote computing system 550, a passenger device executing the rideshare app 570, internal computing device 530, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. An apparatus for performing object tracking, comprising:
   at least one memory; and
   at least one processor coupled to the at least one memory, the at least one processor configured to:
   receive a first set of Light Detection and Ranging (LiDAR) point cloud data corresponding with an object;
   provide the first set of LiDAR point cloud data to an autoencoder neural network to generate a first set of feature embeddings, the first set of feature embeddings comprising one or more semantic attributes associated with the object;
   track a trajectory of the object based on the first set of feature embeddings and one or more physical attributes associated with the object, wherein to track the trajectory of the object based on the first set of feature embeddings the at least one processor is configured to:
   receive a second set of Light Detection and Ranging (LiDAR) point cloud data corresponding with the object;
   provide the second set of LiDAR point cloud data to an autoencoder neural network to generate a second set of feature embeddings, the second set of feature embeddings, and
   compare the first set of feature embeddings with the second set of feature embeddings to determine object continuity over time.

2. The apparatus of claim 1, wherein the one or more physical attributes associated with the object comprises at least one of: a three-dimensional (3D) bounding box size, a bounding box location, or an object classification label.

3. The apparatus of claim 1, wherein the one or more physical attributes associated with the object comprises one or more kinematic attributes.

4. The apparatus of claim 3, wherein the one or more kinematic attributes comprises one or more of: a position associated with the object, a velocity associated with the object, or an acceleration associated with the object.

5. The apparatus of claim 1, wherein the autoencoder neural network is configured to generate an up-sampled voxel grid based on the LiDAR point cloud data.

6. The apparatus of claim 1, wherein to track the trajectory of the object based on the first set of feature embeddings the at least one processor is further configured to:
   provide the first set of feature embeddings and the one or more physical attributes associated with the object to a machine-learning object tracker.

7. A computer-implemented method for tracking an object, comprising:
   receiving a first set of Light Detection and Ranging (LiDAR) point cloud data corresponding with the object;
   providing the first set of LiDAR point cloud data to an autoencoder neural network to generate a first set of feature embeddings, the first set of feature embeddings comprising one or more semantic attributes associated with the object; and
   tracking a trajectory of the object based on the first set of feature embeddings and one or more physical attributes associated with the object;
   wherein tracking the trajectory of the object based on the first set of feature embeddings further comprises:
   receiving a second set of Light Detection and Ranging (LiDAR) point cloud data corresponding with the object;
   providing the second set of LiDAR point cloud data to an autoencoder neural network to generate a second set of feature embeddings, the second set of feature embeddings; and
   comparing the first set of feature embeddings with the second set of feature embeddings to determine object continuity over time.

8. The computer-implemented method of claim 7, wherein the one or more physical attributes associated with the object comprises at least one of: a three-dimensional (3D) bounding box size, a bounding box location, or an object classification label.

9. The computer-implemented method of claim 7, wherein the one or more physical attributes associated with the object comprises one or more kinematic attributes.

10. The computer-implemented method of claim 9, wherein the one or more kinematic attributes comprises one or more of: a position associated with the object, a velocity associated with the object, or an acceleration associated with the object.

11. The computer-implemented method of claim 7, wherein the autoencoder neural network is configured to generate an up-sampled voxel grid based on the LiDAR point cloud data.

12. The computer-implemented method of claim 7, wherein tracking the trajectory of the object based on the first set of feature embeddings further comprises: providing the first set of feature embeddings and the one or more physical attributes associated with the object to a machine-learning object tracker.

13. A non-transitory computer-readable storage medium comprising at least one instruction for causing a computer or processor to:
receive a first set of Light Detection and Ranging (LiDAR) point cloud data corresponding with an object;
provide the first set of LiDAR point cloud data to an autoencoder neural network to generate a first set of feature embeddings, the first set of feature embeddings comprising one or more semantic attributes associated with the object; and
track a trajectory of the object based on the first set of feature embeddings and one or more physical attributes associated with the object;

wherein to track the trajectory of the object based on the first set of feature embeddings the at least one instruction is further configured to cause the processor to:
receive a second set of Light Detection and Ranging (LiDAR) point cloud data corresponding with the object;
provide the second set of LiDAR point cloud data to an autoencoder neural network to generate a second set of feature embeddings, the second set of feature embeddings; and
compare the first set of feature embeddings with the second set of feature embeddings to determine object continuity over time.

14. The non-transitory computer-readable storage medium of claim 13, wherein the one or more physical attributes associated with the object comprises at least one of: a three-dimensional (3D) bounding box size, a bounding box location, or an object classification label.

15. The non-transitory computer-readable storage medium of claim 13, wherein the one or more physical attributes associated with the object comprises one or more kinematic attributes.

16. The non-transitory computer-readable storage medium of claim 15, wherein the one or more kinematic attributes comprises one or more of: a position associated with the object, a velocity associated with the object, or an acceleration associated with the object.

17. The non-transitory computer-readable storage medium of claim 13, wherein the autoencoder neural network is configured to generate an up-sampled voxel grid based on the LiDAR point cloud data.

* * * * *